United States Patent [19]

Mueller

[11] Patent Number: 4,899,962

[45] Date of Patent: Feb. 13, 1990

[54] PORTABLE FIRE RETARDANT SEPARATION WALL ESPECIALLY FOR AIRCRAFT

[75] Inventor: Hans J. Mueller, Hennstedt Ulzburg, Fed. Rep. of Germany

[73] Assignee: Messerschmitt-Boelkow-Blohm GmbH, Munich, Fed. Rep. of Germany

[21] Appl. No.: 303,286

[22] Filed: Jan. 26, 1989

[30] Foreign Application Priority Data

Jan. 27, 1988 [DE] Fed. Rep. of Germany ....... 3802331

[51] Int. Cl.$^4$ .................................................. B64C 1/34
[52] U.S. Cl. .............................. 244/129.2; 244/118.1; 169/48; 169/53; 410/119; 52/2 K; 160/354; 405/150
[58] Field of Search ............... 244/129.2, 118.1, 118.5, 244/905, 146; 160/354, 90; 410/119; 52/2 K, 2 J, 2 B, 2 F, 2 E; 169/48–50, 53; 405/289, 150, 132; 49/34, 477; 523/505, 501; 98/50

[56] References Cited

U.S. PATENT DOCUMENTS

| 3,548,904 | 12/1970 | Mackell | 52/2 K |
| 3,787,010 | 1/1974 | Meronshian et al. | 244/146 |
| 3,990,464 | 11/1976 | Jenkins | 244/905 |
| 4,011,195 | 3/1977 | Self | 523/505 |
| 4,023,372 | 5/1977 | Presper | 49/34 |
| 4,121,790 | 10/1978 | Graham . | |
| 4,220,298 | 9/1980 | Willis | 160/354 |
| 4,366,977 | 1/1983 | Davis et al. | 400/119 |

Primary Examiner—Galen Barefoot
Attorney, Agent, or Firm—W. G. Fasse; D. H. Kane, Jr.

[57] ABSTRACT

A fire retardant separation wall for an aircraft cabin or transport space in an aircraft or in any other craft, is made portable by constructing such a separation wall as a foldable gas-tight wall made out of fire resistant material. A ring hose surrounds the entire separation wall. The ring hose has such a configuration that, when inflated, it will hug the inner contour of the aircraft cabin. The ring hose and, if used, reinforcing inflatable ribs, are inflated by a battery operated compressor so that the entire wall unit is portable and conveniently stored when deflated and folded. A pressurized gas container assures inflation even if a power failure should occur.

19 Claims, 2 Drawing Sheets

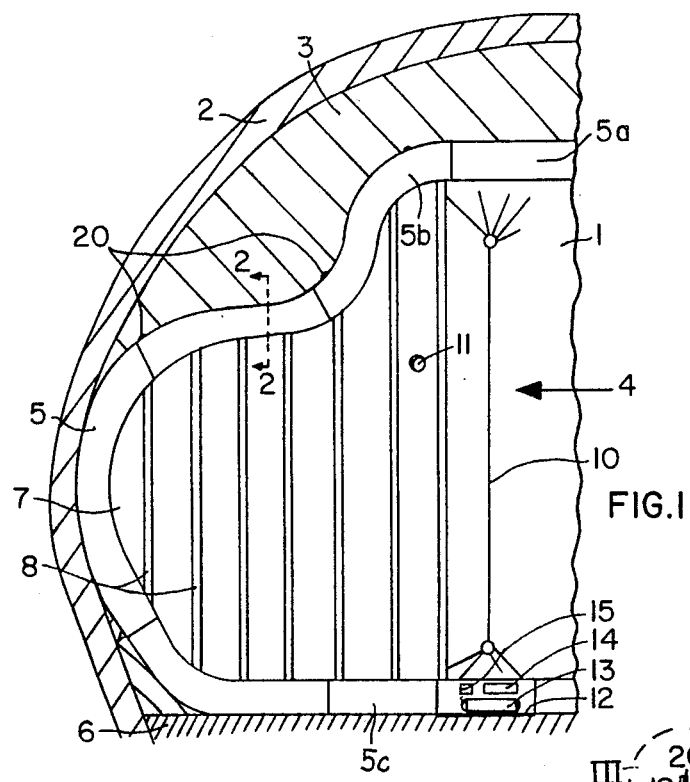
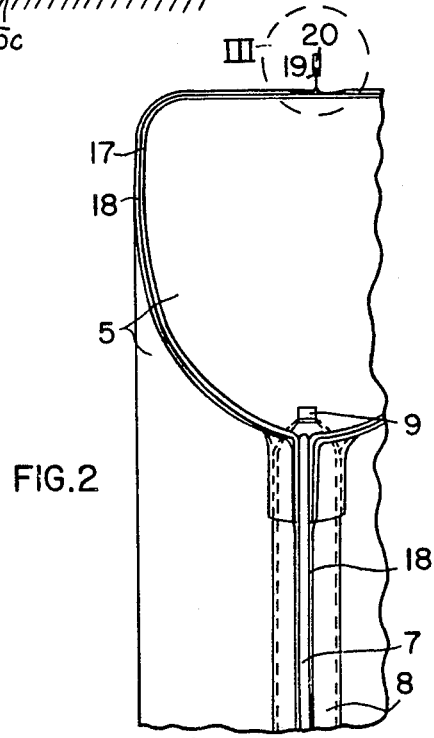

PORTABLE FIRE RETARDANT SEPARATION WALL ESPECIALLY FOR AIRCRAFT

FIELD OF THE INVENTION

The invention relates to a portable fire retardant separation wall especially for aircraft, particularly passenger aircraft and transport aircraft. These walls are capable of separating an area where a fire has started from the remainder of the aircraft interior.

BACKGROUND INFORMATION

It is known to separate the internal space of an aircraft into smaller compartments for avoiding or at least retarding the spreading of a fire to thereby increase the survival chances of passengers and crew. Such conventional separation walls are made of fire resistant, or at least fire retardant materials. However, the fixed location of such conventional separation walls is not very effective in localizing a fire that has started. Another disadvantage of conventional separation walls is seen in that they visibly diminish the so-called large space or jumbo-effect of an aircraft cabin, especially a passenger aircraft cabin. The open space impression intended for such aircraft is usually lost by the installation of known separation walls. Besides, their permanent installation frequently involves substantial modifications in the internal arrangements of the cabin, such as seating arrangements, service area locations, and so forth.

OBJECTS OF THE INVENTION

In view of the above it is the aim of the invention to achieve the following objects singly or in combination:

to improve the fire protection features of an aircraft to thereby increase the survival chances of the passengers and crew by means of portable separation walls which are easily and rapidly installed in a passenger or transport aircraft and even in other environments such as a railroad car, ship, or the like;

to avoid the disadvantages of conventional separation walls and to enable the installation of such walls even in existing aircraft substantially at any desired location or at least at prepared locations; and to make the separation wall sufficiently small when it is not used, so that it can easily be stored while still remaining portable.

SUMMARY OF THE INVENTION

The above objects have been achieved according to the invention by a separation wall which is characterized by foldable sections made of a gas-tight, flame resistant material surrounded by an inflatable ring hose forming a frame equipped with means for pressurizing the inflatable frame. Individual sections of the wall may be separated by inflatable ribs, preferably connected to the inflatable frame for simultaneous inflation of the frame and the ribs. The present separation walls are simple in their construction while assuring an optimal protection and flexibility with regard to the installation location and required peripheral frame configuration, and with regard to the storage location anywhere within an aircraft or the like.

The separation walls according to the invention assure a safe partitioning of an aircraft passenger cabin or freight space when a localized fire has started, whereby the separated space may be kept optimally small. Another advantage of the present portable separation wall is seen in that it is quite compatible with fire safety equipment conventionally present in an aircraft. Due to its simple construction and its minimal need for storage space, the present separation walls are quite suitable for equipping existing aircraft. Due to its lightweight and small volume in the deflated folded state, it is especially suitable for use as a mobile, portable piece of fire fighting equipment.

BRIEF DESCRIPTION OF THE DRAWINGS

In order that the invention may be clearly understood, it will now be described, by way of example, with reference to the accompanying drawings, wherein:

FIG. 1 is a cross-sectional view through an aircraft cabin, partially broken away, with the fire retardant separation wall according to the invention fully inflated and shown in a cabin separating condition;

FIG. 2 is a view approximately along section line 2—2 in FIG. 1;

Figure 3:
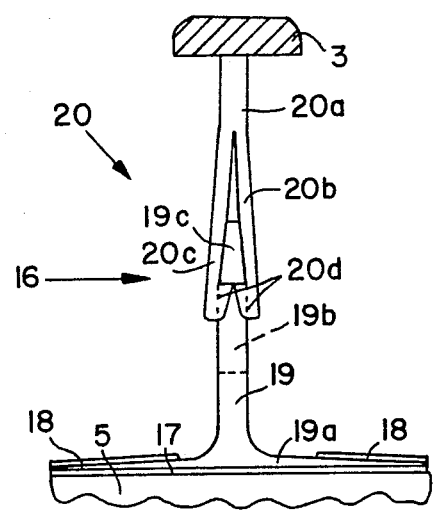
FIG. 3 is an enlarged view of a fastening device shown in the circle III of FIG. 2.

DETAILED DESCRIPTION OF PREFERRED EXAMPLE EMBODIMENTS AND OF THE BEST MODE OF THE INVENTION

The sectional view of FIG. 1 shows a portion of a passenger cabin or transport space 1 in an aircraft body 2, whereby the cabin floor 6 separates an upper cabin space in the body 2 from a lower space in the body 2. The section of the cabin passes, perpendicularly to the longitudinal axis of the aircraft, through a partition bulkhead portion 3 conventionally provided in such aircraft, for example, as a reinforcement. The location of the bulkhead 3 is especially suitable for the placing of a separation wall according to the invention, however, the use of the present walls 4 is not limited to this particular location along the length of an aircraft body.

The separation wall 4 according to the invention is foldable and inflatable. For this purpose, the wall 4 comprises several segments 7 held together by ribs 8, preferably inflatable ribs surrounded by a ring hose 5 forming a frame which has sufficient strength to hold the sections 7 and ribs 8 in a stretched out condition when the ring hose 5 and its ribs are inflated. The ring hose 5 is preferably divided into separate sections 5a, 5b which communicate with each other for the inflation. Bottom sections 5c of the ring hose 5 rest on the floor 6 of the aircraft cabin. After the ring hose 5 has been inflated, it contacts the respective surfaces of the floor, sidewalls, and bulkhead of the aircraft cabin in an airtight manner.

The foldable wall 4 is made of a synthetic fiber webbing or fabric that forms an outer fire retardant layer 18 that is preferably laminated to an inner rubber layer 17 as best seen in FIG. 2. This type of material is readily available on the market and has been used heretofore, for example, for making foldable escape chutes for aircraft safety equipment. However, for the present purposes, the outer fire retardant layer includes up to 98% b y v o l m e of silicon dioxide as a fire retardant.

The above mentioned ribs 8 between the wall sections 7 are also hose type structures extending preferably, but not necessarily in a vertical direction as shown in FIG. 1. The diameter of the inflatable ribs 8 is smaller than that of the ring hose 5. For a simultaneous inflation the ribs 8 are connected with the ring hose 5 by valves 9 shown in FIG. 2.

Figure 5:
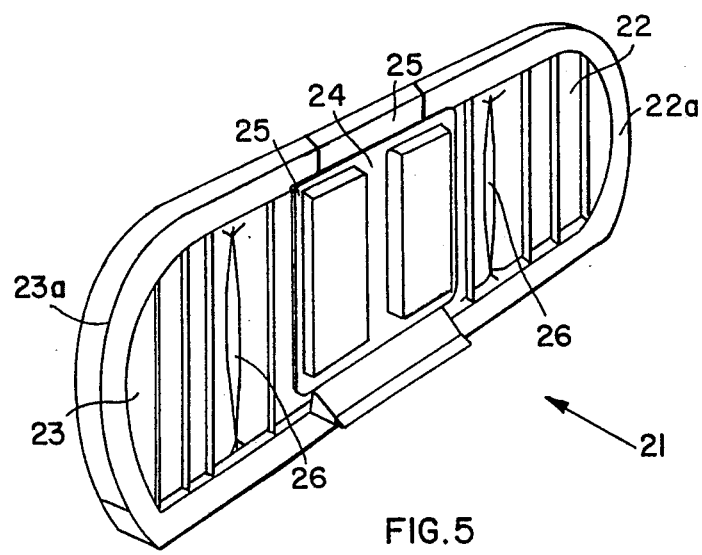
FIG. 5 is a perspective view of a modified embodiment of a separation wall shown in its inflated condition.

The portable separation wall 4 has at least one passageway which is provided with a gas-tight zipper 10 as shown in FIG. 1. The embodiment of FIG. 5 shows two such zippered passages 26. The zipper 10 is so dimensioned in its length that a person can easily pass through the zippered opening even if the person should be carrying fire fighting equipment. The wall 4 is also equipped with a viewing hole 11 made of transparent heat resistant material such as glass. Referring further to FIG. 1, inflating means are mounted on a baseplate 12, preferably located inside the ring hose 5 but in an accessible manner for controlling the inflating of the ring hose 5 and ribs 8. The inflating means comprise a compressed gas bottle or container 13 holding, for example, a gas mixture of compressed carbon dioxide and nitrogen of sufficient expanded volume to inflate the ring hose 5 and ribs 8. The inflating means also include a compressor 14 and a battery 15 for operating the compressor for inflating the hose ring 5 and the ribs 8 simultaneously. The pressurized container 13 provides a possibility of inflating the wall components 5, 8 even if the compressor and/or battery should fail.

The sectional view of FIG. 2 shows the widened diameter of the frame formed by the ring hose 5 as compared to the thickness of the foldable wall sections 7 and to the diameter of the inflatable ribs 8. The entire wall structure of the ring hose 5, the ribs 8, and the wall sections 7, is made of an inner flexible layer 17, for example, made of a gas-tight rubber or silicon-rubber-impregnated material that is heat resistant, such as spun glass fabric. The outer surface or both surfaces of the flexible layer 17 are covered with a fire retardant layer 18 that may contain up to 98% by volume of silicon dioxide as mentioned above.

Figure 4:
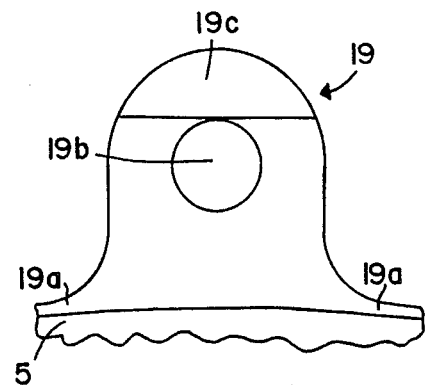
FIG. 4 shows an eyelet of the fastening device as seen in the direction of the arrow 16 in FIG. 3, but omitting the clamping or snap fastener portion of the device.

The frame formed by the hose ring 5 is secured to the inner wall of the aircraft cabin and to the bulkhead 3 at spaced points by means of eyelets 19 cooperating with snap fasteners 20 which will now be described with reference to FIGS. 3 and 4. The eyelets 19 are permanently secured to the ring hose 5, for example, by an adhesive bonding. For this purpose, a foot 19a of the eyelets 19 is bonded into pockets between wall members 17 and 18. Each snap fastener or clamping fastener 20 has a shank or web 20a permanently secured to the wall or bulkhead 3. The shank or web 20a extends into two elastically spreadable legs 20b and 20c. Each leg has at its lower end an inwardly facing hook 20d. These hooks are dimensioned to snap into holes 19b of the eyelets 19. Each eyelet has a top portion 19c with a pointed or conical cross-section so that this pointed or slanting portion 19c may be pushed into the space between the legs 20d and 20c so that the hooks 20d can snap into hole 19b. Incidentally, FIG. 4 is a view in the direction of the arrow 16 in FIG. 3, but omitting the snap fastener 20 in FIG. 4. Practically, the snap fasteners 20 are substantially enclosed by the bulkhead so that a gas-tight seal is formed all around the hose ring 5 when the latter is inflated and the eyelets are simply inserted into the snap fasteners as just described. A tool suitable for sufficiently spreading the elastic legs 20b and 20c may be used to again remove the eyelets from the snap fasteners.

FIG. 5 illustrates a second embodiment of an inflatable fire retardant separation wall 21 having two sections 22 and 23 surrounded by respective hose rings forming frames 22a and 23a interconnected by a common hose frame portion 25. The sections are so constructed that they surround a cabinet wall section 24 of conventional construction. As mentioned above, each wall section may be provided with a zippered passage 26. The inflation takes place by the same means as described above with reference to FIG. 1. The section 25 may be permanently installed as part of the wall section 24. The individual frame sections 22a and 23a are connectable to the section 25, for example, by conventional plug-in valves not shown.

The wall component 24 may, for example, be a separation wall between a first-class section and a tourist class section in an aircraft cabin. Storage wall units, galley walls, and the like, are all suitable to have installed therein in a permanent manner a connecting hose section 25. A portion of the respective cabinets may be used for storing the wall sections 22 and 23 when the latter are deflated and folded. The frame section with the inflating means 13, 14, and 15 may also be stored in the respective cabinet. Additionally, it is possible to interconnect the two sections by a zippered connection or by a Velcro (RTM) connection or the like, where a wall component 24 is not available at the location where the fire retardant wall should be installed. Such zippered or other connections may be provided with sealing lips which, in a known manner, seal the respective connection due to the pressure difference which normally quickly develops between the two cabinet sections that are to be separated by the present wall due to a fire in one of the sections. The snap fasteners 20 and eyelets 19 may also be replaced by a Velcro (TRM) type connection.

The passageways 26 are preferably located in alignment with respective aisles in the aircraft cabin, and the connection of the wall sections, or rather, of the frame forming ring hoses to the internal structure of the aircraft cabin is the same as described above with reference to FIGS. 3 and 4.

When a fire should start in an aircraft during flight, the folded separation wall 4 or 21 is brought into the location where the separation wall is to be installed, whereby the base plate is positioned on the cabin floor. If the base plate 12 should already be in the desired location, then the inflation can start as the first step, except for opening a container or the like. For an easy transport, the base plate 12 may be provided with rollers or with skids, as well as with handles. Inflation is started by switching on the compressor 14. A respective switch is provided for this purpose on the outside of the base plate 12. When the present wall is not in use, the battery 15 is connected to an automatic charger which in turn is supplied by the power supply of the aircraft. Thus, the likelihood that the battery is always ready for inflating the ring hose 5 and the ribs 8 is improved. However, even if there should be a power failure, the pressurized container 13 will be able to inflate the ring 5 and ribs 8.

The above described snap fasteners and the eyelets are so arranged that the inflation of the ring hose 5 automatically causes the eyelets 19 to move into the snap fasteners 20 as described. Passengers from the endangered zone can now be moved through the passage closeable by the zipper 10. Persons equipped with fire fighting means can also pass through this passageway. The present separation walls are equally useable in passenger and freight aircraft and in any other situation where a fire endangered part of an enclosed space is to be closed off from that part of the enclosed space not yet endangered.

Although the invention has been described with reference to specific example embodiments, it will be appreciated that it is intended to cover all modifications and equivalents within the scope of the appended claims.

What I claim is:

1. A portable fire retardant wall for separating a space portion where a fire started from the remainder of an enclosed space, comprising foldable wall means made of a gas-tight, flame resistant material, inflatable ring hose means also made of a foldable, gas-tight, flame resistant material, said ring hose means being secured all around said foldable wall means for forming a frame around said foldable wall means when said ring hose means are inflated, means for inflating said ring hose means when said fire retardant wall is to be installed, and a portable base plate (12) substantially shorter than a width of said enclosed space, said ring hose means and said inflating means being permanently mounted to said portable base plate to form an easily storable unit that is transportable to any desired location within said enclosed space.

2. The wall of claim 1, wherein said ring hose means, in its inflated condition, has a configuration that conforms to an inner contour of an aircraft cabin or the like.

3. The wall of claim 1, further comprising hose type foldable and inflatable reinforcing ribs forming part of said foldable wall means.

4. The wall of claim 3, further comprising valve means for communicating the interior of said hose type reinforcing ribs with the interior of said ring hose means for simultaneously inflating said ring hose means and said hose type reinforcing ribs.

5. The wall of claim 1, wherein said ring hose means comprise a plurality of interconnected individual chambers communicating with each other for a simultaneous inflation.

6. The wall of claim 1, wherein said ring hose means comprise attachment means on a peripheral surface of said ring hose means, and means for securing said attachment means to an inner wall of said cabin or the like.

7. The wall of claim 6, wherein said attachment means comprise eyelets, and wherein said securing means comprise snap fasteners for engaging said eyelets when said eyelets and said snap fasteners are pushed into engagement with each other.

8. The wall of claim 1, wherein said means for inflating comprise a compressor for inflating said ring hose means and power drive means for operating said compressor.

9. The wall of claim 8, wherein said compressor and said power drive means for said compressor are controllably installed in said ring hose means.

10. The wall of claim 1, wherein said means for inflating comprise a pressurized inflating gas container for inflating said ring hose means by releasing the content of said gas container into said ring hose means.

11. The wall of claim 10, wherein said pressurized inflating gas container controllably is installed in said ring hose means.

12. The wall of claim 1, wherein said gas-tight, flame resistant material is coated with a flame resistant webbing comprising silicon dioxide.

13. The wall of claim 1, wherein said gas-tight, flame resistant material is sufficiently flexible for folding said wall including its ring hose means.

14. The wall of claim 1, wherein said portable base plate (12) is located inside said ring hose means.

15. A system for separating a space where a fire has started in an aircraft cabin from the remainder of said aircraft cabin, comprising a plurality of stationary system portions secured at spaced intervals to said aircraft cabin inside thereof, and a portable system portion constructed for cooperation with any one of said stationary system portions when said portable system portion is to be deployed, each of said stationary system portions comprising first snap-fastener elements permanently installed at said spaced intervals, said portable system portion comprising foldable wall means made of a gas-tight, flame resistant material, inflatable ring hose means also made of a foldable, gas-tight, flame resistant material, said ring hose means being secured all around said foldable wall means for forming a frame around said foldable wall means when said ring hose means are inflated, portable means for inflating said ring hose means for installation, said portable system portion further comprising second snap-fastener elements permanently attached to a peripheral surface of said ring hose means in positions for cooperation with said first snap-fastener elements when said ring hose means are inflated for a rapid installation of said portable system portion.

16. The system of claim 15, wherein each of said first snap-fastener elements comprises two elastically spreadable legs (20b, 20c), means (20a) securing said legs to said aircraft cabin, each leg having an inwardly facing hook (20d), said hooks facing each other, and wherein each of said second snap-fastener elements comprises an eyelet (19) secured to said ring hose means for spreading said legs apart when said eyelet is inserted between said legs for said hooks to snap into an opening in said eyelet.

17. The system of claim 16, wherein each eyelet has a portion with a conical cross-section for facilitating an insertion of said eyelet between said legs.

18. The system of claim 15, wherein each of said first snap-fastener elements comprises an eyelet secured to said aircraft cabin, and wherein each of said second snap-fastener elements comprises two elastically spreadable legs secured to said ring hose means, each leg having an inwardly facing hook, said hooks facing each other for snapping into an opening in said eyelet.

19. The system of claim 18, wherein each eyelet has a portion with a conical cross-section for facilitating an insertion of said eyelet between said legs.

* * * * *